(12) United States Patent
    Wollmann

(10) Patent No.: US 10,189,005 B2
(45) Date of Patent: Jan. 29, 2019

(54) PUMP FOR CORROSIVE FLUIDS

(71) Applicant: Thomas Michael Wollmann, Linden (DE)

(72) Inventor: Thomas Michael Wollmann, Linden (DE)

( * ) Notice: Subject to any disclaimer, the term of this patent is extended or adjusted under 35 U.S.C. 154(b) by 0 days.

(21) Appl. No.: 15/607,713

(22) Filed: May 30, 2017

(65) Prior Publication Data

US 2018/0347563 A1    Dec. 6, 2018

(51) Int. Cl.
    *B01J 19/24*    (2006.01)
    *F04C 13/00*    (2006.01)
    *F04C 2/14*     (2006.01)
    *F04C 2/344*    (2006.01)
    *F04C 15/00*    (2006.01)
    *F04C 15/06*    (2006.01)

(52) U.S. Cl.
    CPC ............... *B01J 19/24* (2013.01); *F04C 2/14* (2013.01); *F04C 2/344* (2013.01); *F04C 13/001* (2013.01); *F04C 15/0003* (2013.01); *F04C 15/0069* (2013.01); *F04C 15/06* (2013.01); *B01J 2219/24* (2013.01); *F04C 2240/30* (2013.01)

(58) Field of Classification Search
    CPC ..... B01J 2219/24; F04C 13/001; F04C 15/06; F04C 15/0003; F04C 2/344; F04C 2/14; F04C 15/0069; F04C 2240/30
    See application file for complete search history.

(56) References Cited

U.S. PATENT DOCUMENTS

| | | | | |
|---|---|---|---|---|
| 5,899,813 A | * | 5/1999 | Bunce | F16D 3/72 403/383 |
| 7,806,673 B2 | * | 10/2010 | Muscarella | F04C 2/084 418/206.8 |
| 2005/0081435 A1 | * | 4/2005 | Lastella | B01F 7/18 44/605 |
| 2005/0263935 A1 | * | 12/2005 | Aisenbrey | F04B 49/10 264/115 |
| 2014/0182687 A1 | * | 7/2014 | Guidat | B01L 3/5027 137/1 |
| 2014/0271314 A1 | * | 9/2014 | Morselli | F04C 2/14 418/206.5 |

* cited by examiner

*Primary Examiner* — Lessanework Seifu
(74) *Attorney, Agent, or Firm* — Harness, Dickey & Pierce, P.L.C.

(57) ABSTRACT

The pump includes a pumping chamber within a sealed internal chamber, a pump inlet connected to the pumping chamber, a pump outlet connected to the pumping chamber, and a rotational pumping element configured to pump the corrosive fluid from the pump inlet to the pump outlet. The rotational pumping element is within the pumping chamber. The pump includes a drive shaft for driving the rotational pumping element. The drive shaft is completely within the sealed internal chamber. The drive shaft is configured for magnetically coupling to an external motor. A pump housing forms the sealed internal chamber. The rotational element, the pumping chamber, and the pump housing are formed from any one a conductive plastic, a non-conducting plastic with conducting particles, a semi-conducing ceramic, and combinations thereof. The drive shaft is formed from the semi-conducting ceramic.

13 Claims, 7 Drawing Sheets

PUMP FOR CORROSIVE FLUIDS

FIELD OF THE INVENTION

The present invention relates to pumps and pumping systems, in particular to pumps for corrosive fluids.

BACKGROUND OF THE INVENTION

In some industrial processes, corrosive and potentially explosive fluids need to be pumped into reactors in a controlled fashion.

International patent application publication WO 2006/015218 discloses a nonmetallic pump with a gear pump assembly having an adapter spool mounted to an electric motor. The pump assembly is designed to reduce manufacturing costs and to provide access for many service and maintenance tasks to be performed without breaking any of the pipe connections. The pump assembly also includes a splined shaft system and a lubricating fluid circulation system with spiral grooves located inside a pair of bearings disposed on opposite sides of the gear flights. The assembly also includes a replaceable precision liner that surrounds the gear flights to maintain a tight tolerance for optimal performance of the pump.

SUMMARY OF THE INVENTION

The invention provides for a pump and a biodiesel production system in the independent claims. Embodiments are given in the dependent claims.

Embodiments of the invention may provide for a pump that has both improved resistance to corrosive fluids and ability to prevent explosions by manufacturing components of the pump exposed to the corrosive fluid from a conductive plastic, a non-conducting plastic with conducting particles, a semi-conducting ceramic, and/or combinations thereof. In particular, manufacturing the components from PTFE (Teflon) with carbon particles and/or silicon carbide may provide for greatly reduced resistance to corrosive fluids and a greatly reduced risk of explosion.

In one aspect, the invention provides for a pump for pumping a corrosive fluid. The pump comprises a sealed internal chamber. As used herein 'sealed' is understood to mean that the internal chamber is closed so that the corrosive fluid is not able to leak out of it. The use of the term 'sealed' may or may not indicate that seals such as O-rings or other elastic components are used for sealing the internal chamber. In some examples the sealed internal chamber may be permanently sealed and the use of O-rings or other elastic sealing elements may not be necessary.

The pump further comprises a pumping chamber. The pumping chamber is within the sealed internal chamber. The pump further comprises a pump inlet connected to the pumping chamber. The pump further comprises a pump outlet connected to the pumping chamber. The pump further comprises a rotational pumping element configured for pumping the corrosive fluid from the pump inlet to the pump outlet. The rotational pumping element is within the pumping chamber.

In some examples, the pump may comprise ducts or pathways for the corrosive fluid to travel throughout the sealed internal chamber. The pumping chamber is located within the sealed internal chamber and such ducts or pathways may provide for a means for the equalization of pressure within the sealed internal chamber.

The pump further comprises a drive shaft for driving the rotational pumping element. The drive shaft is completely within the sealed internal chamber. The drive shaft is configured for magnetically coupling to an external motor. The pump further comprises a pump housing. The pump housing forms the sealed internal chamber. The pump inlet and pump outlet may be mounted and connect to a surface of the pump housing.

The rotational element may be formed from any one of the following: a conductive plastic, a non-conducting plastic with conducting particles, a semi-conducting ceramic, and combinations thereof. The rotational element may have multiple components and may be made from a mixture of any of the above-mentioned materials.

The pumping chamber may be formed from any one of the following: the conductive plastic, the non-conducting plastic with conducting particles, a semi-conducting ceramic, and combinations thereof. The pumping chamber is formed from the pump housing. Likewise, the pump housing is formed from any one of the following: a conductive plastic, a non-conducting plastic with conducting particles, a semi-conducting ceramic, and combinations thereof. The pump housing may be formed from multiple components made from any one of these materials and this may result in the pumping chamber therefore being formed from any combination of the above-mentioned materials.

The drive shaft is formed from the semi-conducting ceramic, such as sintered semi-conducting ceramic, in particular by sintering silicon carbide ceramic particles.

Embodiments of the invention provide for a pump that is advantageous in that it is able to pump a corrosive fluid as well as to prevent the build up of static electricity which may cause sparking. This enables the pump to be used in situations where there are corrosive fluids and/or the danger of an explosion caused by sparking or the discharge of static electricity. The use of a semi-conducting ceramic provides an effective means for relieving the build up of static electricity. Normally semiconductors do not conduct electricity. However, at the voltages which are large enough to cause a spark due to static electricity, electrons are able to grow across the band gap and conduct electricity. This may be extremely beneficial as the drive shaft formed from semi-conducting ceramic may combine torsional stiffness with electric conductivity to provide for a safer pump for use in corrosive and/or explosive environments with a long service life.

In another embodiment, the non-conducting plastic is Teflon. Teflon is also known as PTFE or polytetrafluorethen. The use of Teflon or PTFE may be beneficial because Teflon has an extremely high resistance to corrosive materials.

In another embodiment, the non-conducting plastic is polypropylene. Polypropylene is not as resistant to a larger variety of corrosive fluids as Teflon is but may have the advantage of being less expensive.

In accordance with embodiments of the invention, the non-conducting plastic is a thermoplastic polymer. In general, thermoplastic polymers may have some degree of corrosion resistants to a variety of corrosive fluids such as ammonia, sulfuric acid, chlorine sodium hydroxide solution, organic or inorganic chemicals, catalysts and/or sea water. Thermoplastic polymers comprise polypropylene (PP), poly (methyl methacrylate) (PMMA), Acrylonitrile butadiene styrene (ABS), Polylactic acid (polylactide), Polycarbonate (PC), Polyether sulfone (PES), Polyetherketone (PEEK), Polyetherimide (PEI), Polyethylene (PE), in particular Ultra-high molecular weight polyethylene (UHMWPE), Polyp Polyvinyl chloride (PVC) henylene oxide (PPO), Polyphenylene sulfide (PPS), and polymer polytetrafluoroethylene (PTFE) that is also referred to as Teflon, or a combination thereof. Depending on the electrical properties of the selected thermoplastic or mixture of thermoplastics the addition of conductive particles may or may not be required for the explosion prevention.

In another embodiment, the conducting particles comprise graphite. In particular the non-conducting plastic may be a Teflon with 25% graphite suspended or dispersed within the surface. The graphite can also be mixed into polypropylene or into thermoplastic polymers in general. The combination of the graphite may provide for a material that both has high resistance to corrosive fluids and is also able to conduct electricity to disperse static build up of electricity.

In another embodiment, the conducting particles may comprise carbon-nanotubes. The use of carbon-nanotubes is comparable to the use of graphite as the carbon-nanotubes have a high conductivity and thus enable a discharge of static electricity.

In another embodiment, the semi-conducting ceramic is a silicon carbide material, such as sintered and/or carbon fibre reinforced silicon carbide and/or carbon fibre reinforced silicon carbide composite. The use of silicon carbide ceramics may be beneficial because silicon carbide is both a semi-conductor which allows the dispersion of static electricity and also has extremely high resistance to a wide variety of corrosive fluids. This enables the construction of a pump that is safer than known pumps.

In another embodiment, the drive shaft is coupled to the rotational pumping element using a polygonal coupling. In a polygonal coupling both the rotational element and the drive shaft have a matching profile which is used to form a joint that does not have any play or slack in it. The term polygonal coupling is known as "polygonwellen-verbindung" in German. An example of a well-known polygonal coupling is the so-called P3G coupling. In this example, the profile is roughly triangular-shaped with smooth corners or rounded corners. Likewise, another example of a polygonal coupling is the so-called P4G coupling. The rough profile of this polygonal coupling is square-shaped where the corners have been rounded.

In another embodiment, the polygonal coupling is a pre-stressed coupling. A pre-stressed coupling is known as a "kraftschluss verbindung" in German. The pre-stressed coupling could for example be formed by the thermal contraction of the rotational pumping element onto the shaft. For example, the rotational pumping element may be heated and then slid into position and then, as the rotational pumping element cools, it grips or grabs and forms the pre-stressed coupling between the rotational pumping element and the polygonal coupling. This has the benefit of providing for a coupling that has no slack or play in it that is very very strong.

In another embodiment, the pump is a gear pump. The rotational pumping element is formed by a main gear and a secondary gear. The main gear is coupled to the drive shaft. This embodiment may have the benefit that it provides for a pump that is able to withstand the corrosive fluid and has a long service lifetime. In a gear pump two or more gears that mesh with each other pump the fluid using the teeth of the gears. Pump gears may be constructed in different ways. In some gear pumps the fluid is pumped by the action of the teeth of the gears coming together. In other examples the fluid is pumped by the teeth dragging the fluid around the outside of each of the gears. Both types of gear pumps are effective in pumping corrosive fluids.

In another embodiment, the one or more gears may be formed from plastic, such as a thermoplastic polymer, or a semi-conducting ceramic, such as silicon carbide.

In another embodiment, the main gear and the secondary gear have helical teeth. The use of helical teeth may be beneficial because the pump may have fewer vibrations and may produce less noise when pumping.

In another embodiment, the rotational pumping element comprises a gear liner for forming the pumping chamber and for receiving the main gear and the secondary gear. The pump housing is configured for receiving the gear liner. In this embodiment, the gear liner is a separate component that may be removed from the housing. This enables the replacement of the gear liner when it becomes worn.

In another embodiment, the rotational pumping element comprises a gear liner for forming the pumping chamber and for receiving the main gear and the secondary gear. The gear liner is machined into the pump housing. In this embodiment, the gear liner is built into or machined into the pump housing. This may have the advantage that the initial construction of the pump is less expensive.

In another embodiment, the pump further comprises a secondary shaft. The secondary shaft is formed from the semi-conducting ceramic. The secondary shaft is located completely within the sealed internal chamber. The secondary shaft is coupled to the secondary gear. The drive shaft and the main gear are configured for being driven by an external motor via magnetic coupling. The secondary shaft provides a means for the secondary gear to turn. Both the drive shaft and the secondary shaft are located completely within the sealed internal chamber.

In another embodiment, the pump further comprises at least one bearing for the drive shaft and the secondary shaft. The at least one bearing is formed from any one of the following: the conductive plastic, the non-conducting plastic with conducting particles, the semi-conducting ceramic and it may also be constructed from carbon graphite. The use of carbon graphite has the advantage that it provides for a low-friction rotational bearing. However, the carbon graphite is not resistant to all corrosive fluids. In some examples it may be beneficial to use for example the semi-conducting ceramic to construct the at least one bearing.

In some examples, there are two bearings one on either side of the pumping chamber.

The bearings may be used for supporting the drive shaft and also the secondary shaft rotationally.

In another embodiment, the pump is a sliding vane pump. The use of the sliding vane pump may be beneficial because the sliding vane pump may provide for an effective means of pumping a corrosive fluid.

In another embodiment, the sliding vane pump comprises a stator. The rotational pumping element comprises a rotor coupled to the drive shaft. The rotational pumping element further comprises three or more vanes for contacting the stator. The vanes are typically spring or an elastic element is used to force a surface of the vane against the stator. They form as wipers to press and pump the corrosive fluid from the pump inlet to the pump outlet.

The stator, the rotor, and the three or more vanes are formed from any one of the following: the conductive plastic, the non-conducting plastic with conducting particles, and the semi-conducting ceramic. This embodiment may be beneficial because it may provide for a pump that is able to pump corrosive fluids while also reducing the risk of explosion due to sparks or static electricity.

In another embodiment, the pump housing comprises a containment can for forming a magnetic coupler receptacle within the sealed internal chamber. The containment can in some examples is an extension of the pump housing which enables magnetic coupling.

In another embodiment, the pump further comprises an internal magnetic coupler located within the magnetic receptacle. The internal magnetic coupler is cylindrical. The internal magnetic coupler is connected to the drive shaft. The connection between the magnetic coupler and the drive shaft may for example also be a polygonal coupling and/or a pre-stressed coupling.

The internal magnetic coupler may be or is completely within the sealed internal chamber. The pump further comprises an external magnetic coupler located outside of the sealed internal chamber. The external magnetic coupler comprises a cylindrical cavity. At least a portion of the containment can is located within the cylindrical cavity. The external magnetic coupler is configured for rotationally coupling to the internal magnetic coupler.

This embodiment may have the benefit that it provides for a means of driving the rotational pumping element without having any opening which could possibly leak. This may provide for higher safety and also reduce the risk of explosion.

The external magnetic coupler may be configured for mechanically coupling to an external motor. In some embodiments the pump also comprises an external motor which is mechanically coupled to the external magnetic coupler.

The internal and external magnetic couplers can be formed in a variety of different ways. In many instances the internal magnetic coupler and the external magnetic coupler both use permanent magnets. This however is not necessary. There may for example be permanent magnets in just the internal magnetic coupler or the external magnetic coupler and the other uses a material which is able to be magnetized. In yet other examples, the external magnetic coupler uses an electromagnetic which then either couples to a permanent magnet in the internal magnetic coupler or to a magnetizable material.

In some examples the permanent magnets, particularly within the internal magnetic coupler are in the form of rare earth magnets and/or ceramic magnets. The use of a rare earth and/or ceramic magnet may be beneficial because it may have more resistance to the corrosive fluid.

In one example an NdFeB permanent magnet is used within the internal magnetic coupler and/or the external magnetic coupler.

In one example the permanent magnet within the internal magnetic coupler is Samarium Cobalt (SmCo).

These types of magnets may be a advantageous because of both a high resistance to corrosion and also a high resistance to heat. The use of a rare earth magnet and/or ceramic magnet, such as a NdFeB permanent magnet and/or samarium cobalt magnet, within the internal magnetic coupler may enable a greater range of operational temperatures and also the use of better or more aggressive corrosive fluids that are being pumped with or even without encapsulation of the magnets.

In another embodiment, the containment can is non-metallic. This may have the advantage that no magnetic or any current losses occur which would cause a heat input to the pump.

In another embodiment, the magnetic coupler receptacle is cylindrically-shaped. The cylindrical axis of rotation may for example be identical with the axis of rotation of the drive shaft. The magnetic receptacle comprises an end cap. The end cap may be dome-shaped. This embodiment may be beneficial because the dome shape may provide for higher operating pressures within the pump.

In another embodiment, the pump housing is formed by machining. This may be beneficial because it may provide for a means of reducing the cost of producing custom for individual pumps.

In another embodiment, the rotational pumping element is formed by machining. This also may be beneficial because it may reduce the cost of producing low numbers or custom pumps.

In another embodiment, the pumping chamber is formed by machining. This embodiment may be beneficial because it may provide for a cost-effective means of reducing the cost of small number or custom pumps.

In another embodiment, the sealed internal chamber is formed by machining. This embodiment may be beneficial because it may provide for a means of reducing the cost of producing low numbers of pumps or custom pumps.

In another embodiment, the at least one bearing may be constructed by machining. This may have the advantage of being able to provide for reduced cost when manufacturing custom or low quantities of particular pumps.

In another embodiment, the pump has a pumping capacity of 1 liter per hour or greater.

In another embodiment, the pump has a pumping capacity of 100 liters per minute or greater.

In another embodiment, the pump has an operating temperature of at least 65° C. In some embodiments, this temperature may be much higher.

In another embodiment, the system pressure of the pumping chamber may be n bars or less.

In another embodiment, the system or operating pressure may 15 bars or less.

In another embodiment, the system pressure may be 16 bars or less.

In another embodiment, the system pressure may be 20 bars or less.

In another embodiment, the differential pressure between the pump inlet and the pump outlet may be 5 bars or less.

In another embodiment, the differential pressure may be 10 bars or less.

In another embodiment, the differential pressure may be 20 bars or less.

In another embodiment, the flow or pumping rate of the pump may be 4.5 $m^3$ per hour or less.

In another embodiment, the flow or pump rate may be 10 $m^3$ per hour or less.

In another aspect, the invention provides for a biodiesel production system. A biodiesel production system as used herein is a system which converts an oil of an animal or vegetable origin into biodiesel which can be used for powering a diesel engine such as in a truck, car or other vehicle. The biodiesel production system comprises a reactor chamber for receiving oil. The oil here is understood to be an oil of biological origin such as from an animal or plant. In some examples the reactor may be filled directly with an oil which is suitable for directly producing biodiesel. In other examples the biodiesel production system may have a filtration or cleaning system for cleaning oil which is not clean, such as has been used in restaurants. The biodiesel production system further comprises a methanol pump system for supplying methanol to the reactor chamber. The biodiesel production system further comprises a catalyst pump system for supplying a catalyst to the reactor chamber.

The catalyst pump system comprises a pump for pumping the catalyst into the reactor chamber. The pump comprises a sealed internal chamber. The pump further comprises a pumping chamber. The pumping chamber is within the sealed internal chamber. The pump further comprises a pump inlet connected to the pumping chamber. The pump inlet is connected to a tank or a source which is for supplying the catalyst. The pump further comprises a pump outlet connected to the pumping chamber. The pump outlet may also be fluidically connected to the reactor chamber so that the catalyst can be pumped into the reactor chamber.

The pump further comprises a rotational pumping element configured for pumping the corrosive fluid from the pump inlet to the pump outlet. The rotational pumping element is within the pumping chamber. The pump further comprises a drive shaft for driving a rotational pumping element. The drive shaft is completely within the sealed internal chamber. The drive shaft is magnetically coupled to an external motor. The pump further comprises a pump housing. The pump housing forms the sealed internal chamber. The rotational element, the pumping chamber, and the pump housing are formed from any one of the following: a conductive plastic, a non-conducting plastic with conducting particles, and a semi-conducting ceramic. These materials may also be used in any combination to construct these components. The drive shaft is formed from the semi-conducting ceramic.

In another embodiment the rotational element, the pumping chamber and the pump housing are formed from either a silicon carbide or Teflon which comprises graphite or other carbon particles within it.

In another embodiment, the drive shaft is formed from silicon carbide.

In another embodiment, the pump is a gear pump.

In another embodiment, the pump is a rotary vane pump.

It is understood, that the various embodiments may be combined as long as they are not mutually exclusive.

BRIEF DESCRIPTION OF THE DRAWINGS

In the following preferred embodiments of the invention will be described, by way of example only, and with reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
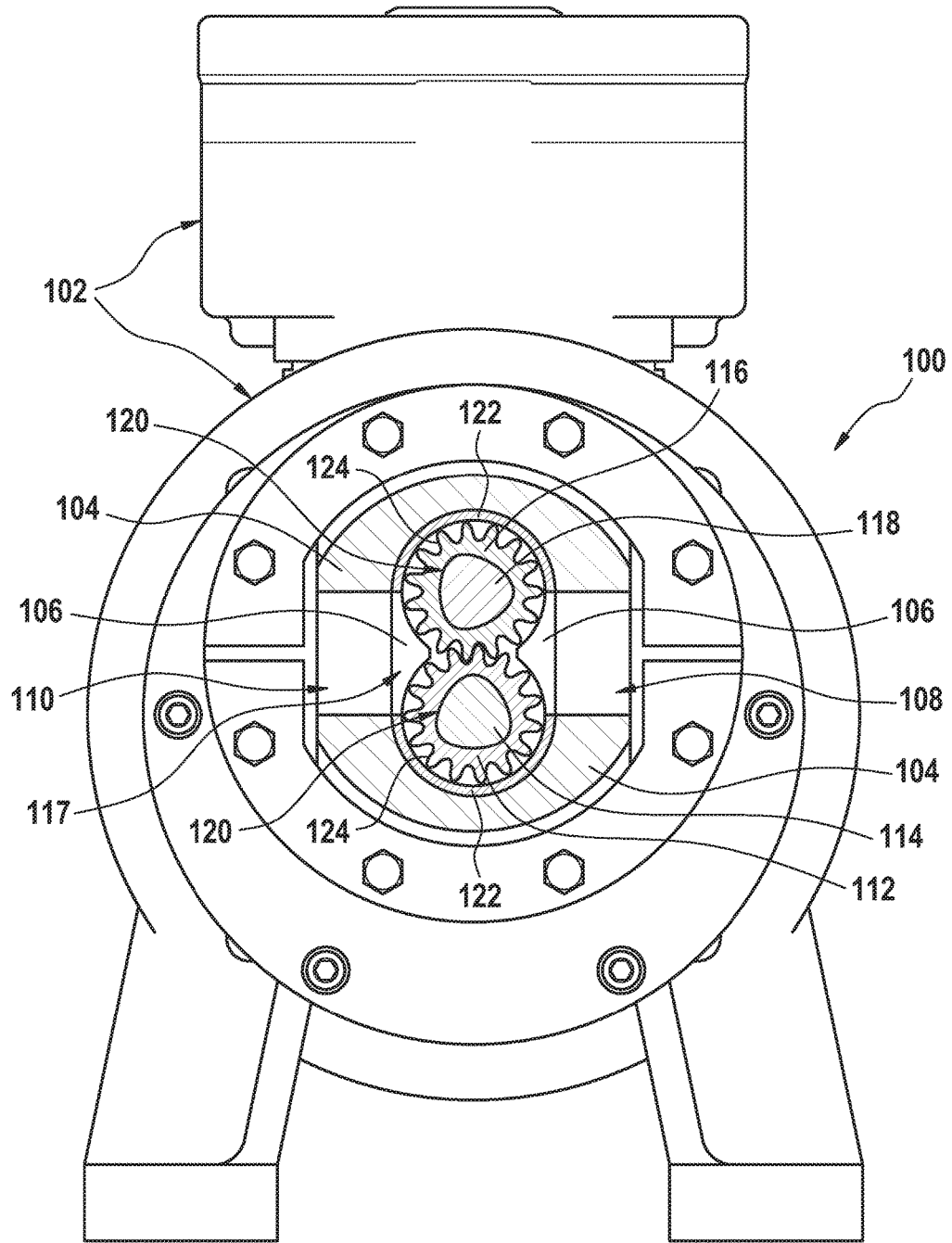
FIG. 1 illustrates an example of a gear pump.

FIG. 1 illustrates an example of a gear pump 100 that is connected to an external motor 102. The view shown in FIG. 1 is a cross-sectional side view which cuts through the center of the pumping chamber 106. The gear pump comprises a pump housing 104. Within the pump housing is a pumping chamber 106. All of the components which are exposed to a corrosive fluid are within a sealed internal chamber. The sealed internal chamber is not shown in this FIG. 1 but the pumping chamber 106 is entirely within the sealed internal chamber. The pumping chamber has a pump inlet 108 and a pump outlet 110. The gear pump 100 has a main gear 112 that is driven by a drive shaft 114. The drive shaft 114 is magnetically coupled to the external motor 102. The magnetic coupling is not illustrated in this FIG. The gear pump 100 also comprises a secondary gear 116 that is connected to a secondary shaft 118. The main gear 112 and the secondary gear 116 form a rotational pumping element 117.

Both the main gear 112 and the secondary gear 116 are connected to their shafts 114, 118 using a polygonal coupling 120. The polygonal coupling 120 shown in this FIG. is a P3G polygonal coupling. Other polygonal couplings could also be used which have different geometries.

The main gear 112 and the secondary gear 116 both have gear teeth 124 that mesh at the center of the gear pump 100. In this example, the gear teeth mesh together and do not provide a large volume which would be able to pump fluid. The fluid is therefore pumped by the motion of the gear teeth 124 across the surface of the gear liner 122. When the main gear 112 rotates in a clockwise direction then the pump inlet is 108 and the pump outlet is 110. If the direction of the main gear 112 were reversed then the positions of the pump inlet 108 and the pump outlet 110 would be reversed. The identification of which is the pump inlet 108 and the pump outlet 110 may therefore depend upon the exact mechanical construction of the gear pump 100 and also the electric motor 102 that it is connected to. The pump inlet 108 and the pump outlet 110 can therefore also be generically referred to as access ports or access to the pumping chamber 106.

Figure 2:
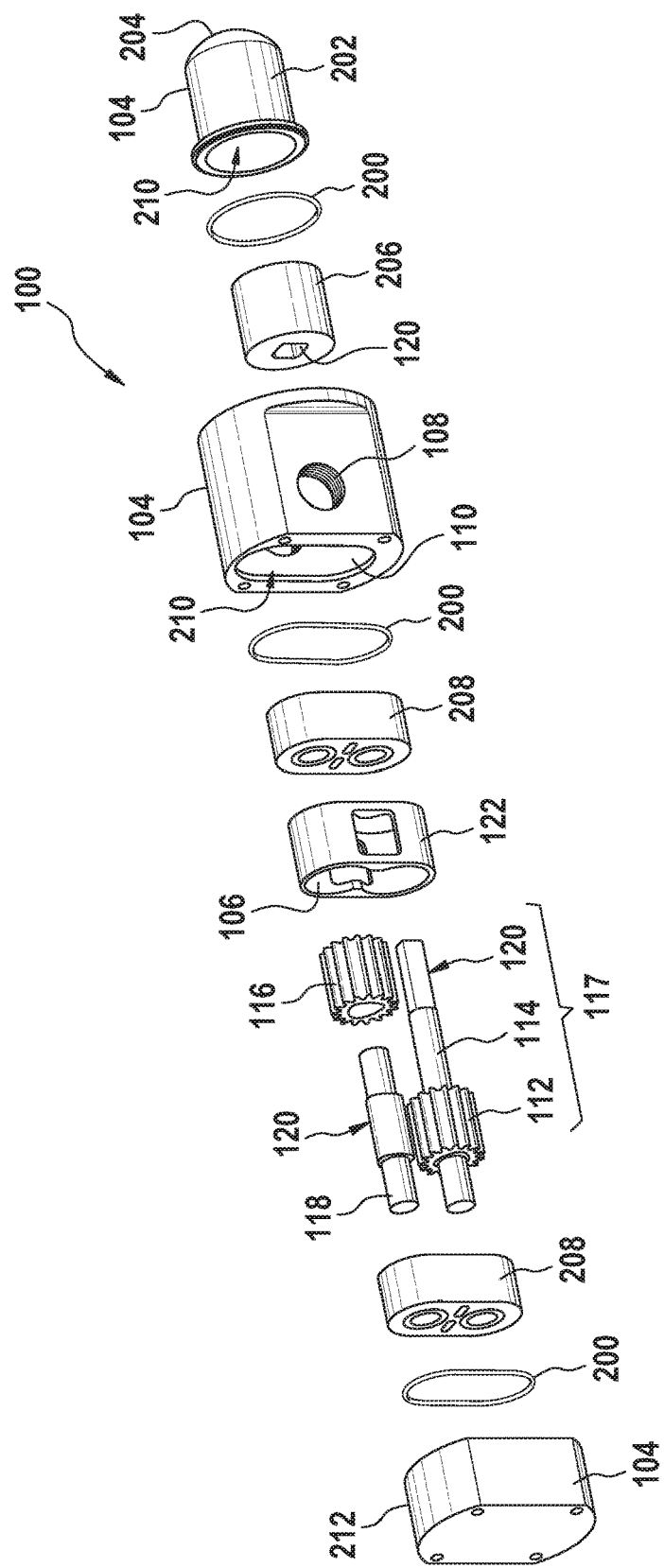
FIG. 2 illustrates a further example of a gear pump.

FIG. 2 shows an exploded view of the gear pump 100 of FIG. 1. In this view it can be seen that the housing is made from several components. The housing 104 has several components which surround and encompass the components of the gear pump and also has a containment can 202. In this FIG. 1 an internal magnetic coupler 206 can be seen. The internal magnetic coupler 206 is connected to the drive shaft 114 by a polygonal coupling 120. The internal magnetic coupler 206 is able to rotate within the containment can 204. An external magnetic coupler can be used to then rotate the drive shaft 114 while the pump housing 104 is sealed. The containment can 202 has a domed end cap 204. The use of the domed end cap enables a higher pressure within the pumping chamber 106.

The sealed internal chamber 210 is formed in the spaces labelled 210 when the components of the housing 104 are assembled. The gear liner 112 is able to be inserted into the sealed internal chamber 210 of the pump housing 104. In this example the pumping chamber 106 is formed within the space of the gear liner 122. Having a removable gear liner 122 is advantageous because it may be replaced easily when worn. This however is not the only alternative. The structure of the gear liner 122 could also be machined directly into the pump housing 104. Also, shown in this Fig. are bearings 208 which each have two holes for supporting the secondary shaft 118 and the drive shaft 114. In some instances the bearings 208 may have grooves or holes which enable the corrosive fluid to travel throughout the sealed internal chamber 210 to equalize the pressure during use of the gear pump 100.

In this example, it can be seen that the housing 104 comprises a removable port 212. The removable port enables easy disassembly of the gear pump 100 for maintenance and/or for replacing components.

Figure 3:
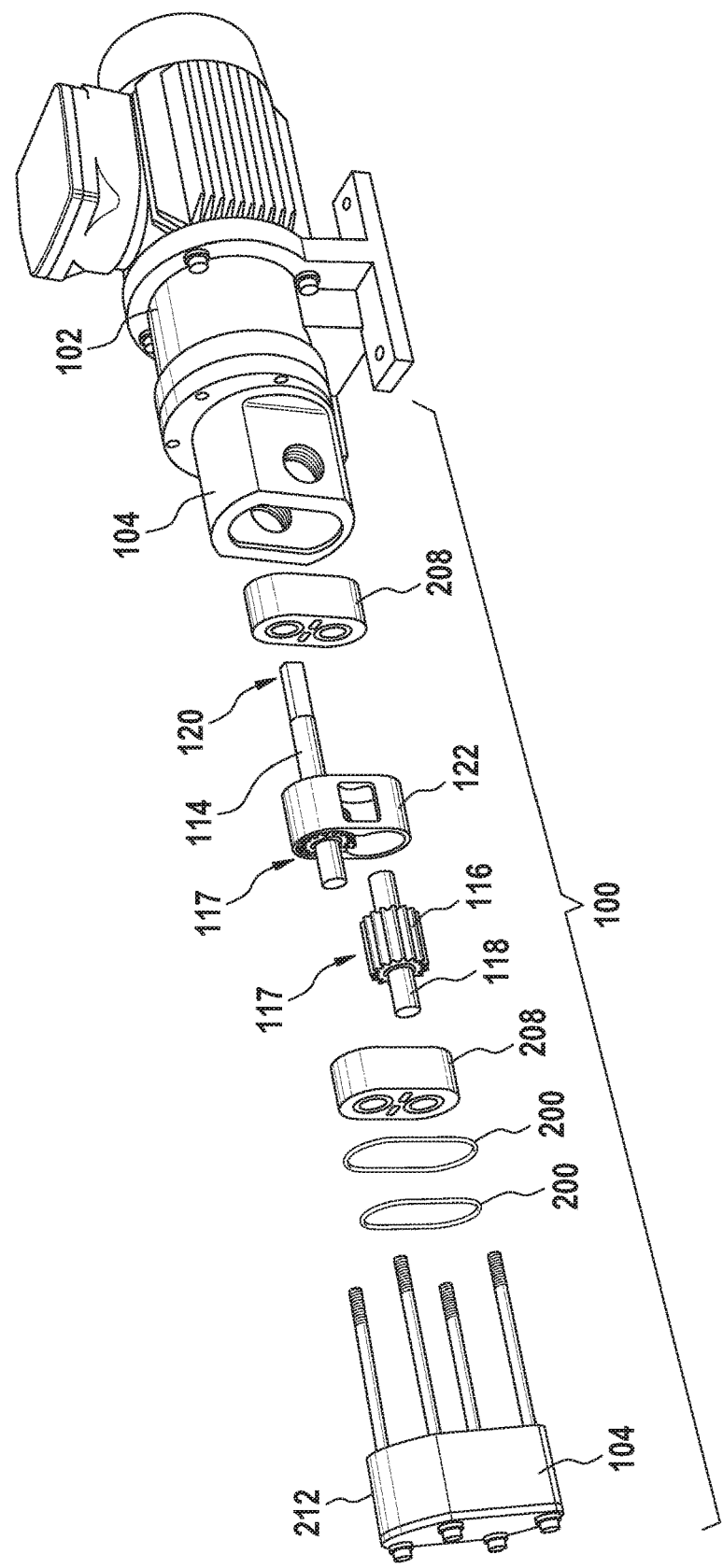
FIG. 3 illustrates a further example of a gear pump.

FIG. 3 shows a further example of a gear pump 100. The design of the gear pump 100 in FIG. 3 is similar to that as is shown in FIG. 2. In this example the gear pump 100 is shown as being mounted to an external motor 102 which is able to drive the drive shaft 114 via a magnetic coupling which is not shown in this Fig.

Figure 4:
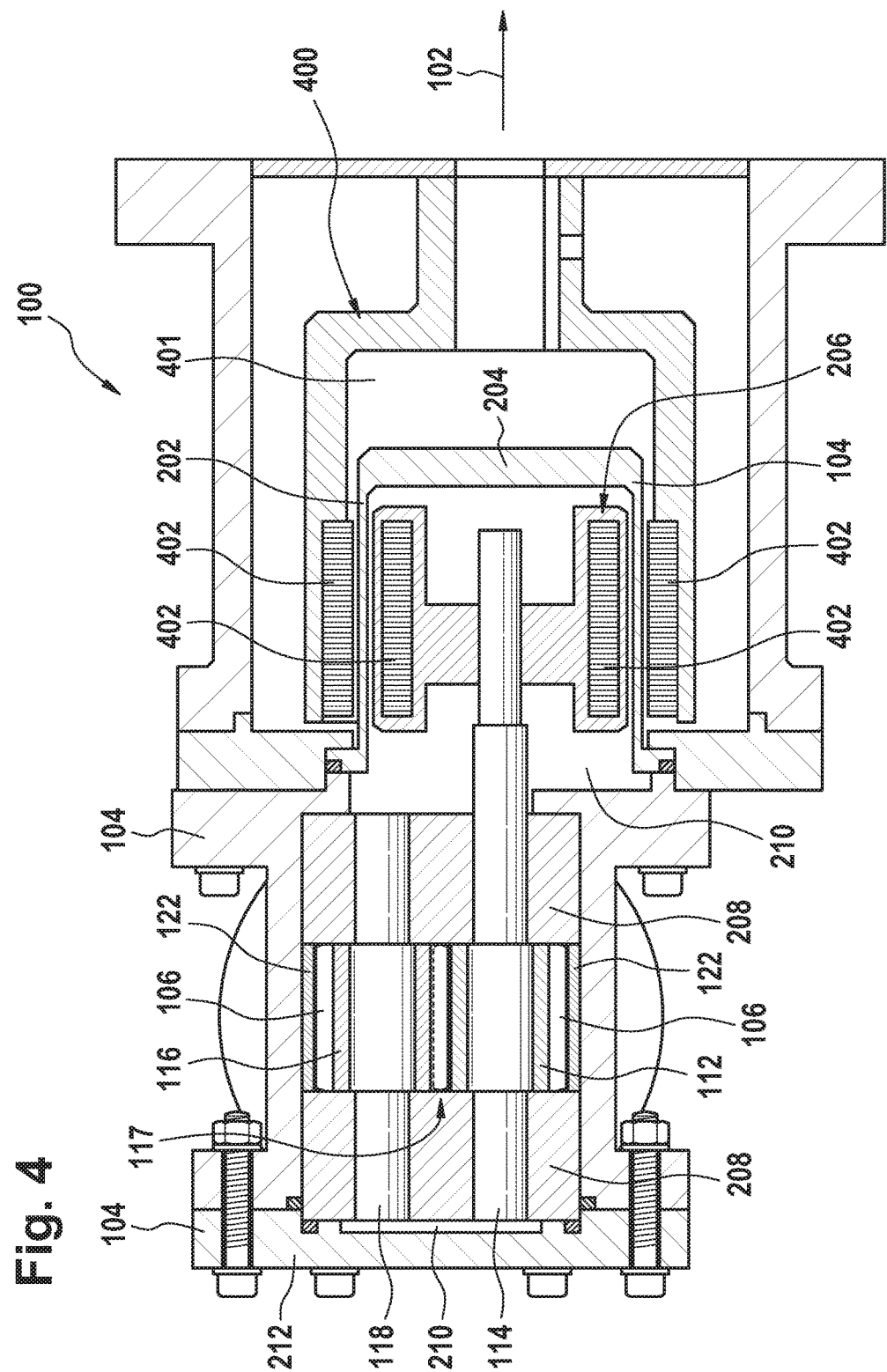
FIG. 4 illustrates a further example of a gear pump.

FIG. 4 illustrates another example of a gear pump 100. In FIG. 4 a cross-sectional view that passes through both the drive shaft 114 and the secondary shaft 118 is shown. The connection between the drive shaft 112 and the internal magnetic coupler 206 is clearly shown. In this example, the containment can 202 has a flat end cap 204. The example shown in FIG. 4 can also be modified such that the end cap 204 is also domed as is illustrated in FIG. 2. In this Fig. there is an external magnetic coupler 400 which has a cylindrical cavity 401. It can be seen that the containment can 202 fits within this cylindrical cavity 401. Both the external magnetic coupler 400 and the internal magnetic coupler 206 are shown as having permanent magnets 402. This causes a magnetic coupling between the external magnetic coupler 400 and the internal magnetic coupler 206. The arrow labelled 102 shows where an external motor could be connected to the external magnetic coupler 400. It can be seen that the components of the gear pump 100 are within the sealed internal chamber 210 formed by the pump housing 104. The pumping chamber 106 is only a portion of the sealed internal chamber 210.

In FIGS. 1 through 4, the rotational pumping element 117, the pumping chamber 106, and the pump housing 104 may be manufactured from any one of the following: a conductive plastic, a non-conducting plastic with conducting particles, a semi-conducting ceramic and combinations thereof. The drive shaft 114 and the secondary shaft 118 may be manufactured from a semi-conducting ceramic also. In some examples the rotational pumping element 117, the pumping chamber 106, and the pump housing 104 may be manufactured from Sicon Carbide or Teflon with carbon particles (PTFE C25%). In some examples the drive shaft 114 and the secondary shaft 118 may be manufactured from Silicon Carbide. The main gear 112 and/or the secondary gear 116 may be formed from plastic, such as a thermoplastic polymer, or a semi-conducting ceramic, such as silicon carbide.

Figure 5:
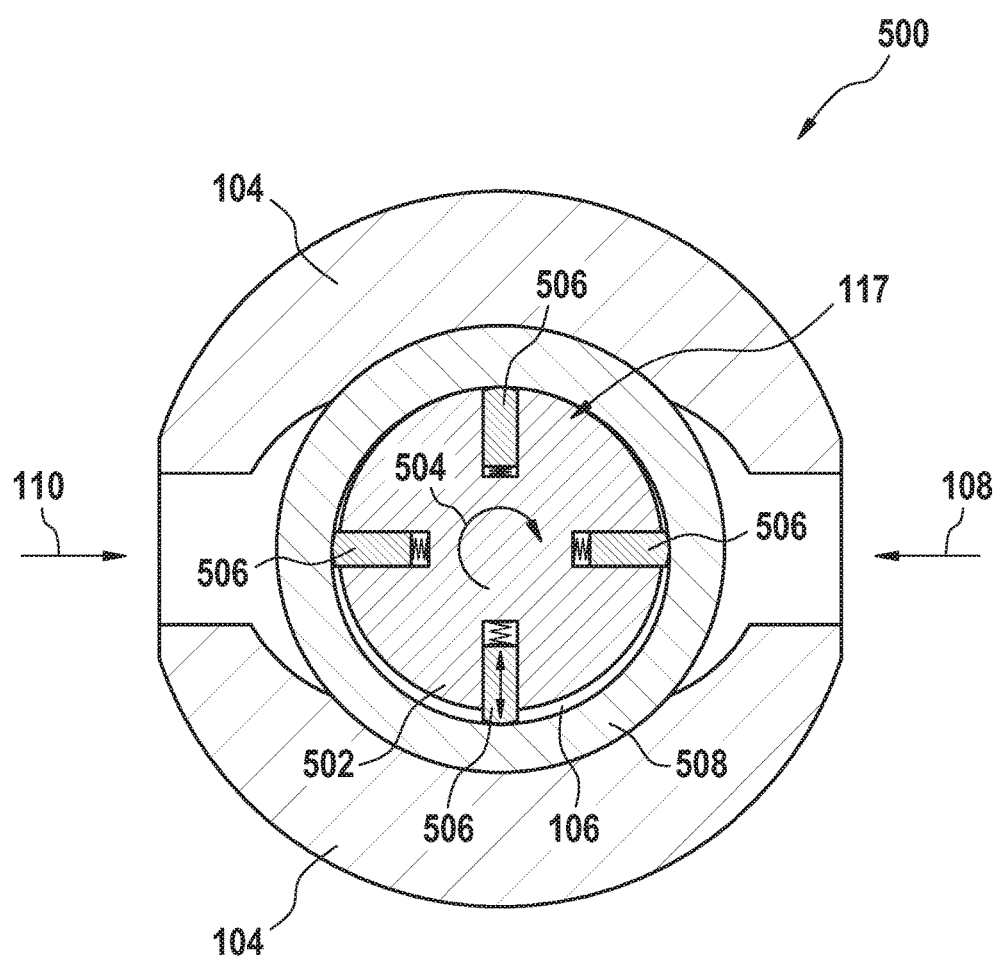
FIG. 5 illustrates an example of a sliding vane pump.

FIG. 5 illustrates an example of a sliding vane pump 500. The pump again comprises a pump housing 104 which has a pumping chamber 106. The pump housing 104 has a pump inlet 108 and a pump outlet 110 that provides access to the pumping chamber 106.

The sliding vane pump 500 comprises a rotor 502. When the rotor 502 turns in the direction indicated by the arrow 504 then 108 is the inlet and 110 is the outlet. When the direction of the arrow 504 is reversed then the inlet 108 and the outlet 110 have their positions reversed. Within the rotor 502 is a number of sliding vanes 506. The sliding vanes are spring loaded or with an elastic element that makes it maintain contact with a stator 508. The rotation 504 and the changing position of the sliding vanes 506 causes fluid to be pumped from the inlet 108 to the outlet 110.

Figure 6:
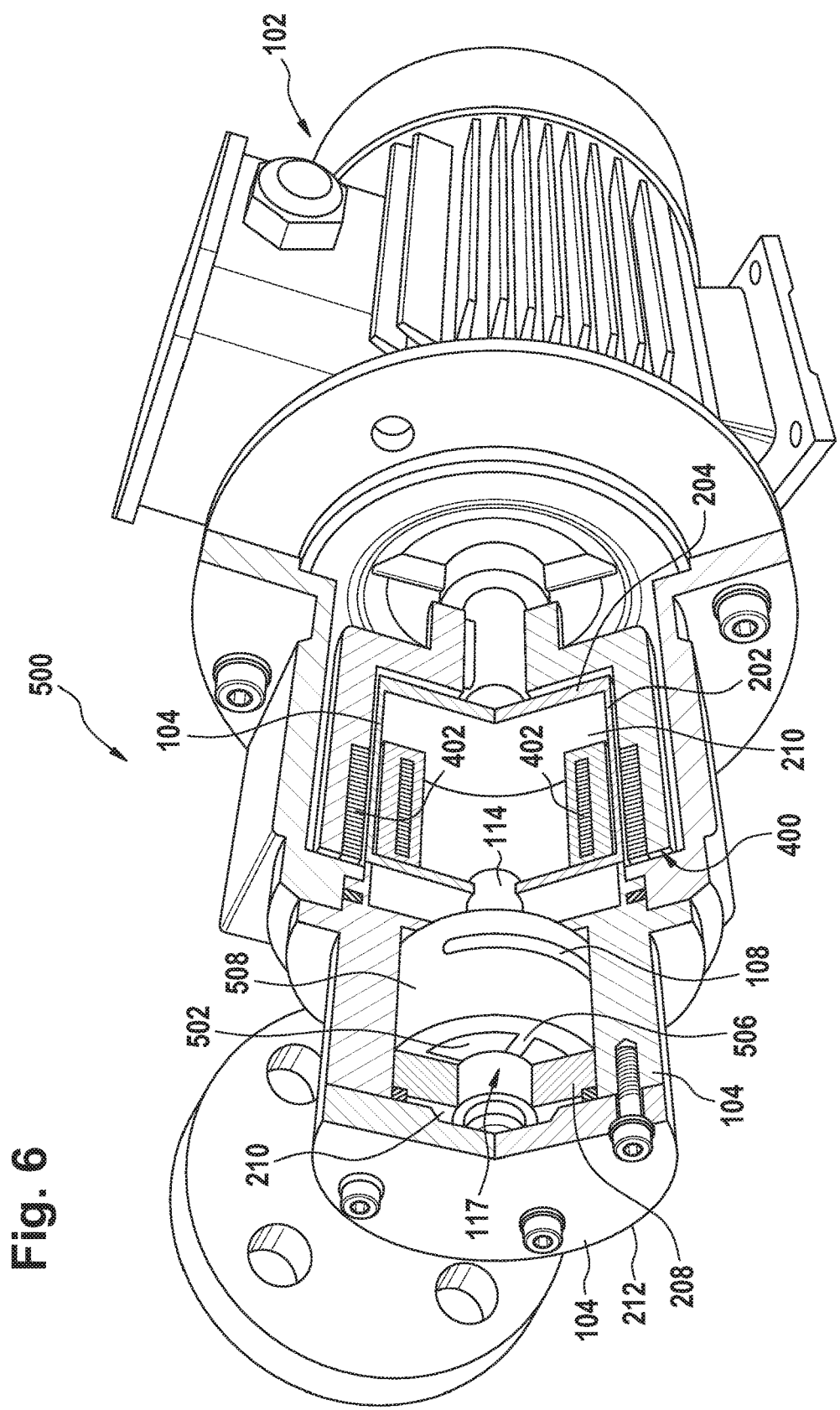
FIG. 6 illustrates a further example of a sliding vane pump.

FIG. 6 shows a further example of a sliding vane pump 500. The pump in FIG. 6 shows many components in common with the pumps illustrated in FIGS. 1-4. In this case the rotational pumping element 117 is formed by the rotor 502 and the vanes 506. The components within the sealed internal chamber 210 may be made of a conductive plastic, a non-conducting plastic with conducting particles, and a semi-conducting ceramic. The drive shaft 114 is made from the semi-conducting ceramic.

The bearings 208 may additionally be constructed from either the conductive plastic, a non-conducting plastic with conducting particles, a semi-conducting ceramic and in some instances it may be made from solid graphite.

Figure 7:
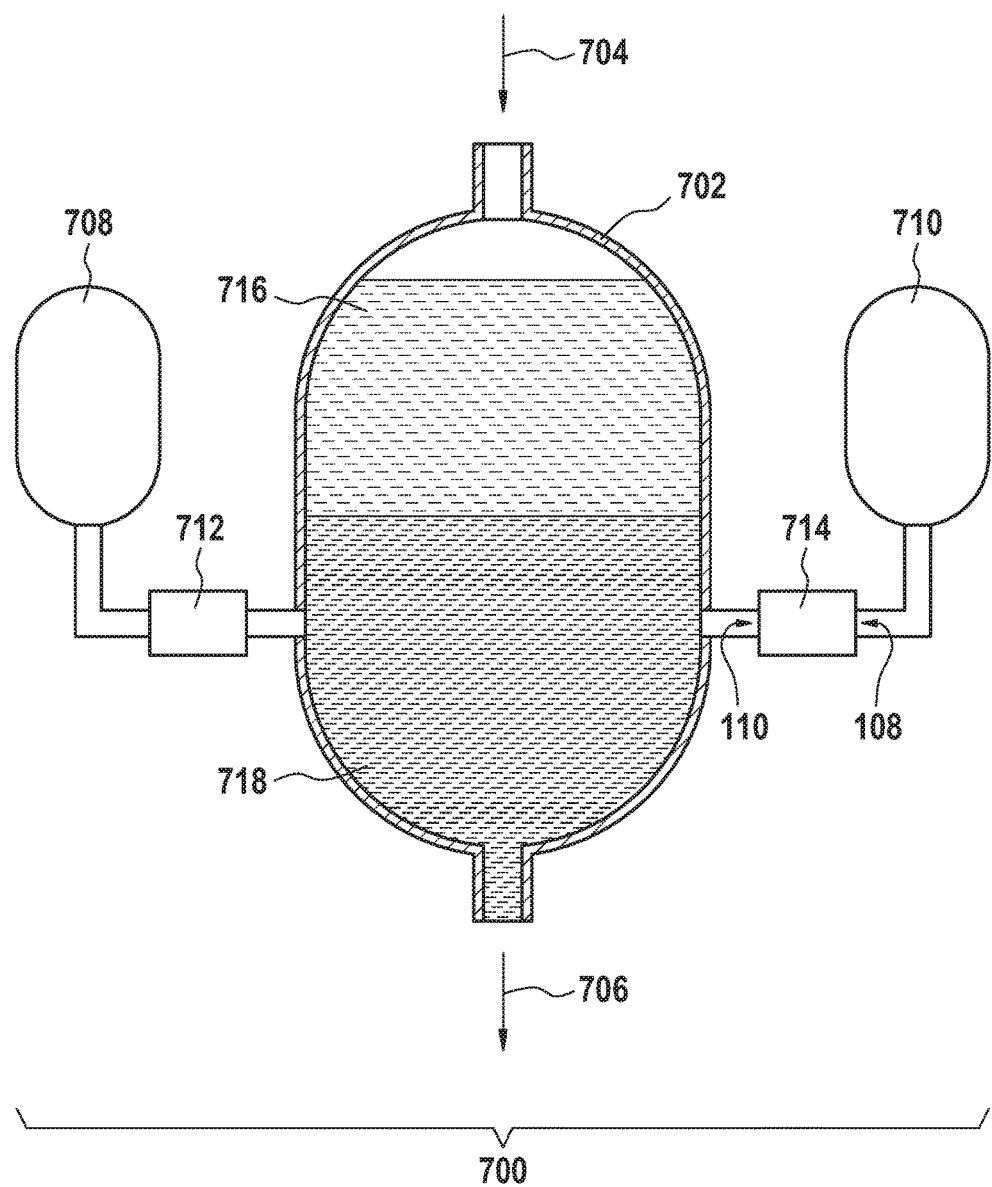
FIG. 7 illustrates an example of a biodiesel production system.

FIG. 7 illustrates an example of a biodiesel production system 700. The biodiesel production system 700 comprises a reactor chamber 702. The reactor chamber 702 has an inlet 704 and an outlet 706. There may be additional components at the inlet 704 to purify oil from a biological source such as an animal or plant which can be then pumped or placed into the reactor chamber 702. The outlet 706 may also have additional components to remove glycerine 718 and/or methanol from the finished biodiesel 716. The reactor 702 is shown as being connected to a methanol reservoir filled with methanol 708 via a methanol pump system 712. The reactor chamber 702 is also shown as being connected to a catalyst reservoir filled with a catalyst 712. The catalyst reservoir 710 is connected to the reactor chamber 702 via a catalyst pump system 714. The catalyst pump system 714 may be a pump according to an example such as is illustrated in any one of FIGS. 1, 2, 3, 4, 5, and 6. When the catalyst 710 is mixed with oil and methanol the oil separates into the biodiesel 716 and the glycerine 718. After the outlet 706 there may be further processing to purify the biodiesel 716 and remove any glycerine 718 or methanol which may make the biodiesel potentially too flammable. The use of a pump as described herein for the catalyst pump system 714 has the benefit that the catalyst is highly corrosive and may destroy most pumps and additionally the presence of the methanol may make the system explosive if there are sparks. The use of a pump as described herein may then provide for a more safe and durable biodiesel production system In the pumps illustrated in FIGS. 1 through 6, it is beneficial to highly corrosion-resistant PTFE or silicon carbide. However, various materials may be substituted for the conductive plastic, the non-conducting plastic with conducting particles, and the semi-conducting ceramic to save money when the pump is used with less corrosive and/or explosive fluids . A variant made of Polypropylene PP could be made for weaker corrosive applications.

Optionally, components of the pumps can be replaced by components made from other materials such as stainless steel (1.4571), Hastelloy C276 and/or titanium if the customer so desires. The shafts can also be made from alumina or 99.5% high-purity aluminum oxide ceramic. Plain bearings are available from carbon graphite, silicon carbide or PTFE C25%. O-rings or sealing elements can for example be made of NBR, EPDM, FKM and FFKM are available for the static seals.

Machining of the pump components, such as CNC milling, has the advantage that the same computer numeric control (CNC) data can be used for controlling the machining irrespective of the choice of material in contrast to a molding process where the mold depends on the chosen material.

The gear and sliding vane pumps illustrated herein may also be driven dry at low speeds without damage for a period of time useful for self priming.

In addition to biodiesel production systems, the pumps describe herein may also be useful for: application in the chemical industry; wastewater treatment, for example for ferric (III) chloride dosing, for oleo chemistry, in the paper and pulp industry, and in the construction of chemical plants and industrial apparatuses.

LIST OF REFERENCE NUMERALS

100 Gear Pump
102 external motor
104 pump housing
106 pumping chamber
108 pump inlet
110 pump outlet
112 main gear 114 drive shaft
116 secondary gear
117 rotational pumping element
118 secondary shaft
120 polygonal coupling
122 gear liner
124 gear teeth
200 sealing element
202 containment can
204 end cap
206 internal magnetic coupler
208 bearing
210 sealed internal chamber
212 removable port
400 external magnetic coupler
401 cylindrical cavity
402 permanent magnet
500 sliding vane pump
502 rotor
504 direction of rotation
506 vane
508 stator
700 biodiesel production system
702 reactor chamber
704 inlet to reactor chamber
706 outlet to reactor chamber
708 methanol reservoir filled with methanol
710 catalyst reservoir filled with catalyst
712 methanol pump system
714 catalyst pump system
716 biodiesel
718 glycerin

What is claimed is:

1. A pump for pumping a corrosive fluid, wherein the pump comprises:
    a sealed internal chamber;
    a pumping chamber, wherein the pumping chamber is within the sealed internal chamber;
    a pump inlet connected to the pumping chamber;
    a pump outlet connected to the pumping chamber;
    a rotational pumping element configured for pumping the corrosive fluid from the pump inlet to the pump outlet, wherein the rotational pumping element is within the pumping chamber;
    a drive shaft for driving the rotational pumping element, wherein the drive shaft is completely within the sealed internal chamber, wherein the drive shaft is configured for magnetically coupling to an external motor;
    a pump housing forming the sealed internal chamber, the pump housing including a containment can for forming a magnetic coupler receptacle within the sealed internal chamber,;
    a cylindrical internal magnetic coupler located within a magnet receptacle, the cylindrical internal magnetic coupler being connected to the drive shaft; and
    an external magnetic coupler located outside of the sealed internal chamber, the external magnetic coupler including a cylindrical cavity, at least a portion of the containment can being located within the cylindrical cavity, the external magnetic coupler being configured for rotationally coupling to the cylindrical internal magnetic coupler;
    wherein the rotational pumping element, the pumping chamber, and the pump housing are formed from an electrically non-conducting plastic with electrically conducting particles;
    wherein the drive shaft is formed from an electrically semi-conducting ceramic;
    wherein the electrically non-conducting plastic includes polytetrafluoroethylene;
    wherein the electrically conducting particles include graphite;
    wherein the electrically semi-conducting ceramic includes sintered silicon carbide;
    wherein the magnetic coupler receptacle is cylindrically shaped and includes a dome shaped end cap; and
    wherein any one of: the pump housing is formed by machining, the rotational pumping element is formed by machining, the pumping chamber is formed by machining, the sealed internal chamber is formed by machining, and combinations thereof.

2. The pump of claim 1, wherein the drive shaft is coupled to the rotational pumping element using a polygonal coupling.

3. The pump of claim 2, wherein the polygonal coupling is a pre-stressed coupling.

4. The pump of claim 1, wherein the pump is a gear pump, wherein the rotational pumping element is formed from a main gear and a secondary gear, wherein the main gear is coupled to the drive shaft.

5. The pump of claim 4, wherein the main gear and the secondary gear have helical teeth.

6. The pump of claim 4, wherein the rotational pumping element comprises a gear liner for forming the pumping chamber and for receiving the main gear and the secondary gear, wherein the pump housing is configured for receiving the gear liner.

7. The pump of claim 4, wherein the rotational pumping element comprises a gear liner for forming the pumping chamber and for receiving the main gear and the secondary gear, wherein the gear liner is machined into the pump housing.

8. The pump of claim 4, wherein pump further comprises a secondary shaft, wherein the secondary shaft is formed from the electrically semi-conducting ceramic, wherein the secondary shaft is located completely within the sealed internal chamber, wherein the secondary shaft is coupled to the secondary gear.

9. The pump of claim 8, wherein the pump further comprises at least one bearing for the drive shaft and the secondary shaft, wherein the at least one bearing is formed from the electrically non-conducting plastic with electrically conducting particles.

10. The pump of claim 1, wherein the pump is a sliding vane pump.

11. The pump of claim 10, wherein the sliding vane pump comprises a stator, wherein the rotational pumping element comprises a rotor coupled to the drive shaft, wherein the rotational pumping element further comprises three or more vanes for contacting the stator, and wherein the stator, the rotor, and the three or more vanes are formed from the electrically non-conducting plastic with conducting particles.

12. A biodiesel production system comprising:
    a reactor chamber for receiving oil;
    a methanol pump system for supplying methanol to the reactor chamber; and
    a catalyst pump system for supplying catalyst to the reactor chamber;
    wherein the catalyst pump system includes the pump of claim 1.

13. The pump of claim 1, wherein the pump is any one of a gear pump or a rotary vane pump.

\* \* \* \* \*